US012668160B2

(12) United States Patent
Ostling

(10) Patent No.: US 12,668,160 B2
(45) Date of Patent: Jun. 30, 2026

(54) METHOD AND SYSTEM FOR OCCUPANT PROTECTION IN A VEHICLE

(71) Applicant: Autoliv Development AB, Vargarda (SE)

(72) Inventor: Martin Ostling, Bramhult (SE)

(73) Assignee: Autoliv Development AB, Vargarda (SE)

( * ) Notice: Subject to any disclaimer, the term of this patent is extended or adjusted under 35 U.S.C. 154(b) by 135 days.

(21) Appl. No.: 18/569,469

(22) PCT Filed: Jun. 15, 2022

(86) PCT No.: PCT/EP2022/066264
§ 371 (c)(1),
(2) Date: Dec. 12, 2023

(87) PCT Pub. No.: WO2022/263490
PCT Pub. Date: Dec. 22, 2022

(65) Prior Publication Data
US 2024/0166092 A1 May 23, 2024

(30) Foreign Application Priority Data
Jun. 17, 2021 (DE) ..................... 10 2021 115 699.8

(51) Int. Cl.
*B60N 2/427* (2006.01)
*B60N 2/02* (2006.01)
(Continued)

(52) U.S. Cl.
CPC ....... *B60N 2/42736* (2013.01); *B60N 2/0272* (2023.08); *B60N 2/0276* (2013.01);
(Continued)

(58) Field of Classification Search
CPC ...... B60N 2/0272; B60N 2/0276; B60N 2/06; B60N 2/4221; B60N 2/427;
(Continued)

(56) References Cited

U.S. PATENT DOCUMENTS 5,626,203 A 5/1997 Habib
11,214,211 B2 * 1/2022 Kartenberg ........ B60N 2/42745
(Continued)

FOREIGN PATENT DOCUMENTS

DE 102017204773 A1 * 9/2018 ....... B60R 21/01554
DE 10 2020 108799 B3 7/2021
(Continued)

OTHER PUBLICATIONS

Nishiyama, JP H07-215114, machine translation. (Year: 1995).*
Eberle, WO 2006/089720, machine translation. (Year: 2006).*
Martin, DE 10 2017 204 773, machine translation. (Year: 2018).*

*Primary Examiner* — Mark L. Greene
(74) *Attorney, Agent, or Firm* — Dickinson Wright PLLC

(57) ABSTRACT

A method for occupant protection in a vehicle, a vehicle occupant protection system, a vehicle and a computer readable medium. The vehicle comprising at least one seat for accommodating an occupant, wherein the seat is slidably connected with the vehicle by a connection mechanism, and wherein the seat is lockable in a defined seating position by a locking mechanism, to prevent sliding in the connection mechanism when locked and to allow sliding when unlocked, the method comprising determining an imminent or ongoing vehicle crash; determining a seating position; upon the determination of the seat being an in a rearward seating position and the occurrence of an imminent or ongoing vehicle crash; unlocking the locking mechanism to allow the sliding of the seat from the rearward seating position towards a conventional driving seating position.

17 Claims, 4 Drawing Sheets

(51) Int. Cl.

| | |
|---|---|
| *B60N 2/06* | (2006.01) |
| *B60N 2/42* | (2006.01) |
| *B60R 21/013* | (2006.01) |
| *B60R 21/015* | (2006.01) |
| *B60R 21/00* | (2006.01) |
| *B60R 21/01* | (2006.01) |

(52) U.S. Cl.
CPC ............. *B60N 2/06* (2013.01); *B60N 2/4221* (2013.01); *B60N 2/4279* (2013.01); *B60R 21/013* (2013.01); *B60R 21/01554* (2014.10); *B60R 2021/0004* (2013.01); *B60R 2021/01231* (2013.01); *B60R 2021/01238* (2013.01)

(58) Field of Classification Search
CPC ............ B60N 2/42727; B60N 2/42736; B60N 2/4279; B60R 21/013; B60R 21/01554; B60R 2021/0004; B60R 2021/01231; B60R 2021/01238; B60R 2021/01225
See application file for complete search history.

(56) References Cited

U.S. PATENT DOCUMENTS

| | | | |
|---|---|---|---|
| 11,485,256 | B2 | 11/2022 | Nakano |
| 2018/0292821 | A1 | 10/2018 | Minato et al. |
| 2023/0158924 | A1 | 5/2023 | Amstein et al. |

FOREIGN PATENT DOCUMENTS

| | | | | | |
|---|---|---|---|---|---|
| JP | H07215114 | A | * | 8/1995 | |
| WO | WO-2006089720 | A1 | * | 8/2006 | ....... B60R 21/01554 |
| WO | 2015/041269 | A1 | | 3/2015 | |
| WO | 2019/020672 | A1 | | 1/2019 | |

\* cited by examiner 102    108a                                112a

106

116

110

104

100

108b

112b

114

110

116

108c

112c

116

110

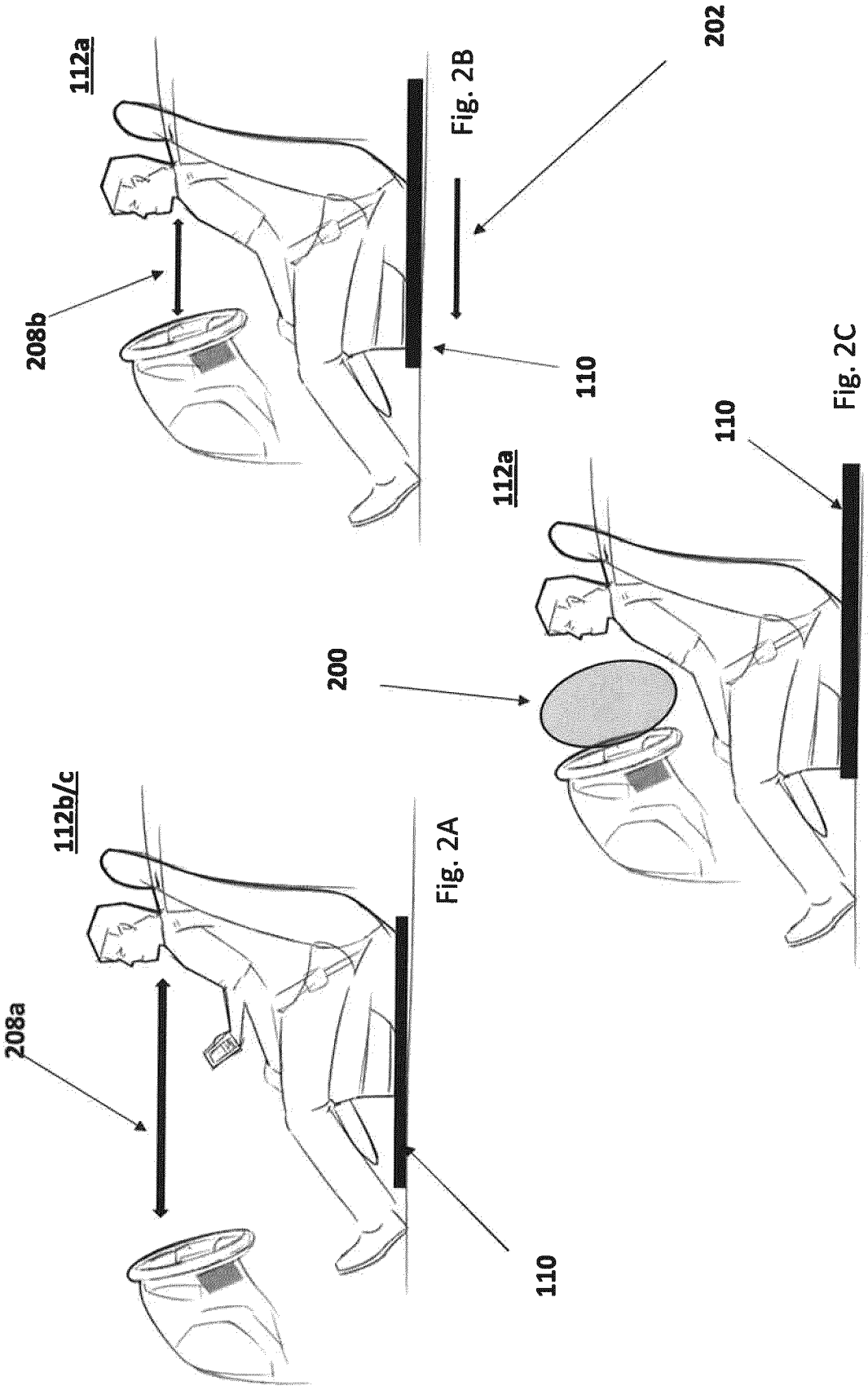

400

402

404

406

METHOD AND SYSTEM FOR OCCUPANT PROTECTION IN A VEHICLE

TECHNICAL FIELD

The present disclosure relates to vehicle technology.

In particular, the present disclosure relates to the protection of occupants of a vehicle.

Further in particular, the present disclosure relates to a method for occupant protection in a vehicle, a vehicle occupant protection system, a vehicle and a computer readable medium.

BACKGROUND

In recent years, automation in a vehicle operation has significantly increased. Whereas historically, a driver of a vehicle was tasked with the complete operation of a vehicle in order to drive the vehicle, more and more electronic systems included in modern vehicles assist the driver while operating the vehicle or even relief the driver completely off certain tasks. E.g., a driver assist system keeping a lane and maintaining a pre-set speed while at the same time maintaining a minimum distance to a vehicle in front of one's own vehicle already is a standard feature in most modern cars. Such a system may be considered the first step in fully automated vehicle operation, also known as autonomous vehicle operation.

An autonomous vehicle is capable of sensing its environment and operating without involvement of a human driver, at least for a certain amount of time. The human driver may not be required to control the vehicle at any time, or it may even not be present in of the vehicle at all. A fully autonomous of the vehicle may go anywhere a traditional vehicle may go and may perform any acts of driving or operating the vehicle like an experienced human driver.

Certain levels of autonomous operation of the vehicle allow that the drivers concern themselves with other tasks not related to the immediate operation of the vehicle. This may include that the driver is not required to constantly monitor the vehicle surroundings and the traffic situation in order to be able to take over operation of the vehicle at short notice. E.g., a certain level of autonomous operation may allow the driver to read or to operate a mobile device while removing their attention from the vehicle operation. Even more extreme, a certain level of autonomous operation may allow the driver to go to sleep while the autonomous vehicle continues the journey.

In such a scenario the driver may assume a seating position which is different from a conventional driving seating position required for the direct operation of the vehicle by the driver. E.g., the driver may assume a more rearward seating position. Such a reward seating position, or autonomous operation seating position may even allow the driver to substantially lay down and go to. As such, such a reward seating position or autonomous operation seating position may be substantially further rearward compared to the conventional driving seating position so that a driver, or generally an occupant of the vehicle, e.g., a passenger, is outside of the normal or optimal operating range of an airbag. In other words, a vehicle occupant arranged in a rearward seating position may not be fully or optimally protected by an airbag in a vehicle crash scenario.

Thus, there may be a need to provide increased protection to a vehicle occupant seated in a non-conventional seating position.

Further, there may be a need to protect occupants of a vehicle more flexibly by an airbag.

SUMMARY

At least one such need may be met by the subject-matter of the independent claims. Preferred embodiments are provided in the dependent claims and are explained in detail in the following description.

According to a first aspect of the disclosure, there is provided a method for occupant protection in a vehicle, the vehicle comprising at least one seat for accommodating an occupant, wherein the seat is slidably connected with the vehicle by a connection mechanism, and wherein the seat is lockable in a defined seating position by a locking mechanism, to prevent sliding in the connection mechanism when locked and to allow sliding when unlocked, the method comprising determining an imminent or ongoing vehicle crash; determining a seating position; upon the determination of the seat being an in a rearward seating position and the occurrence of an imminent or ongoing vehicle crash; unlocking the locking mechanism to allow the sliding of the seat from the rearward seating position towards a conventional driving seating position, in particular wherein the sliding of the seat from the rearward seating position towards the conventional driving seating position is performed by using inertial energy from the vehicle crash.

According to a second aspect of the disclosure, there is provided a vehicle occupant protection system, comprising a seat for accommodating the occupant, a connection mechanism adapted to slidably connect the seat and the vehicle, and a locking mechanism to lock the seat in a defined seating position, to prevent sliding in the connection mechanism when locked and to allow sliding when unlocked, a crash sensor element adapted for determining an imminent or ongoing vehicle crash; a seating position sensor element adapted for determining a seating position; wherein, upon the determination of the seat being an in rearward seating position and the occurrence of an imminent or ongoing vehicle crash, the locking mechanism is unlocked, to allow the sliding of the seat from the rearward seating position towards a conventional driving seating position, in particular wherein the sliding of the seat from the rearward seating position towards the conventional driving seating position is performed by using inertial energy from the vehicle crash.

According to a third aspect of the disclosure, there is provided a computer-readable storage medium comprising instructions which, when executed by a computing element, cause the computing element to carry out the steps of the method according to the present disclosure.

According to a fourth aspect of the disclosure, there is provided a vehicle comprising a computing element comprising a computer-readable storage medium comprising instructions which, when executed by a computing element, cause the computing element to carry out the steps of the method according to the present disclosure, and/or comprising a vehicle occupant protection system according to according to the present disclosure.

In conventional vehicles, an occupant of the vehicle may have a more reward seating position so that an airbag does not restrain sufficiently well in particular during a frontal collision crash. In an autonomous vehicle, in particular in an autonomous driving mode, the driver may assume an even more rearward and relaxed, reclined seating position, which may result in them potentially being completely out of an area of protection of an airbag in a frontal collision crash.

Both scenarios have in common that the occupant of the vehicle has moved the seat so far to the rear, thus away from the airbag, that the airbag may not provide sufficient protection anymore in a vehicle crash scenario. In other words, the occupant is situated such that they are out of reach of the inflated airbag when a crash occurs. The present disclosure aims at a repositioning of the occupant from a non-conventional seating position to a substantially conventional driving seating position in the event of a vehicle crash, thereby moving the occupant back into the area of operation of the airbag. Alternatively, or additionally, the present disclosure aims at adapting the airbag, i.e. the shape or structure of the airbag, to a specific seating position of the occupant, thereby providing its protective function even in the event of an assumed non-conventional seating position.

In order to increase the protection of the occupant in a crash scenario, the present disclosure repositions the occupant in a crash scenario by at least partially moving the seat from the non-conventional seating position or rearward seating position to the conventional driving seating position. They non-conventional seating position, rearward seating position or autonomous may be any position where the occupant is situated so far away from the associated airbag so that protection of the occupant by the airbag is reduced, in particular, such a seating position may be a seating position where the occupant assumes additional tasks regularly not associated with the operation of a vehicle, e.g., reading, operating a mobile device or sleeping. Likewise, in the case of a non-driver occupant, such a seating position may simply be an extreme rearward seating position reducing the protection of the associated airbag. In case a certain seat is associated with more than one airbag, such a seating position may at least reduce the protection of one associated airbag.

In order to provide the repositioning of functionality, the seat may be slidably connected with the vehicle by a connection mechanism, which allows the sliding of the seat, in particular the repositioning of the seat between at least one conventional driving seating position and at least one non-conventional seating position. The slidable connection mechanism may be the same as the mechanism for adjusting the seat position by the occupant or may be an additional connection mechanism dedicated specifically to the sliding or repositioning of the seat in the event of a vehicle crash. The seat is locked in place by a mechanical, electromechanical or electromagnetic locking mechanism. This locking mechanism may be the same mechanism that is operated by an occupant of the vehicle when adjusting seating position, or it may be a different, in particular additional locking mechanism.

During the operation of the vehicle, the vehicle may substantially continuously monitor and/or determine in intervals or upon external input whether a vehicle crash is imminent or currently ongoing and may substantially continuously monitor and/or determine in intervals or upon external input a current seating position of the occupant or rather the seat. In case and imminent or ongoing vehicle crash is determined as well as that the seating position is a non-conventional seating position, the locking mechanism may be unlocked, in particular actively unlocked, thereby allowing the substantially free moving of the seat, i.e., the sliding of the seat along the connection mechanism. The sliding or repositioning of the seat, e.g., from the non-conventional seating position to the conventional driving seating position or in other words from a seating position with a reduced protection by the airbag to a seating position with an increased protection by the airbag, may be provided passively or actively.

A passive sliding may e.g., be the sliding due to occurring inertial forces acting on the seat and/or the occupant. In other words, the vehicle may be decelerated to a higher degree by the vehicle crash than the seat/occupant, which in turn move into the direction of the force, e.g., slide to the front of the vehicle along the or guided by the connection mechanism. Alternatively, the seat may be repositioned actively by an electro-mechanic element, e.g., a motor, or by a suitable explosive charge.

In order to safely and reliably assume the conventional driving seating position, the sliding of the seat may be controlled, in particular may only be allowed up to a defined position, which may be the optimal conventional driving seating position for protection by the airbag. In order to safely assume this conventional driving seating position, and energy absorption element may be provided to absorb or otherwise surrender inactive excess energy that would move the seat further than the defined position. Such excess energy may occur based on the severity of the vehicle crash and/or result from the active repositioning of the seat, e.g., may be excess energy from the explosive charge.

Upon determination that the seat is in the preferred or defined position for airbag activation, the airbag may be activated. In other words, the activation of the airbag may be delayed until the seat/occupant has assumed a conventional driving seating position. The delay may thus result from the time required to reposition the seat from the non-conventional seating position to the conventional driving seating position. Additionally, or alternatively, the delay may be a calculated delay considering parameters like severity of the vehicle crash, the specific non-conventional seating position, vehicle operating parameters, occupant size and occupant weight.

Thus, the seat and its fixed, non-conventional seating position is released by an electromechanical, electromagnetic or pyrotechnic element, the seat is sliding forward or rather in the direction of the force acting on the seat/occupant, e.g., inertial energy, in combination with a following energy absorption in the seat rails or the connection mechanism. Subsequently, the airbag is activated in a delayed manner resulting in the protection of the occupant, e.g., by restraining the neck and the hats of the occupant. Thereby, the severity of the crash pulse is reduced by energy absorption, i.e., by the energy absorption element with a subsequent protection by the airbag, which supports the head and neck of the occupant when the occupant is closer to the conventional driving seating position, e.g., the front of the vehicle. In case of a driver, the airbag is released when the driver is closer to the steering wheel.

It should be noted that the present disclosure is not limited to a vehicle driver and the associated driver airbag but may be applied to all occupants of a vehicle, e.g., also a passenger residing on the passenger side of the vehicle and the associated passenger airbag.

The non-conventional seating position may be rearward in the seat rails and may additionally or alternatively be reclined, e.g., 43 to 46 degrees.

In case of a vehicle crash, the inertia of the seats and the seated occupant may can be considered to load the seats in both vertical and horizontal direction. A load limiter or energy absorption element may be arranged between the seat rail and the vehicle floor, e.g., provided in the connection mechanism connecting the seat and the vehicle and may reduce said loading. When unlocking a locking mechanism holding or locking the seat in a defined seating position, the loading exceeds the load limiter force level, and the seat will move relative to the seat rails/vehicle floor in the direction of the occurring force. Alternatively, upon on a locking, the seat will start to move or slide in the seat rails, thereby engaging the load limiter, which may provide an increasing or progressively increasing counterforce to prevent the sliding of the seat into a further non-conventional seating position, e.g., a seating position which is even closer to the front of the vehicle than the dedicated conventional driving seating position arranged for optimal protection by the airbag.

After the displacement of the seat, the airbag is deployed in a delayed manner. Each airbag, e.g., the driver airbag and a passenger airbag, may have an individual activation time, in particular may have different activation times, in particular considering the activation time or delay after the occurrence of the crash. Each individual activation time or delay may depend on seat and occupant individual parameters, e.g., the respective initial (non-conventional) seating position of the respective occupant, occupant size, occupant weight and crash severity. They crash severity may be estimated by determining a current g-force level, vehicle velocity and the (three dimensional) deceleration (vector) of the vehicle due to the crash. Further, the vehicle may employ at least one camera element or at least one radar sensor to determine the crash, estimating or calculation and impact velocity, impact points and impact angle of a further vehicle involved in the crash to estimate or calculate the crash severity.

A typical time delay of e.g., the driver airbag may be in the range of 10 to 60 ms. In a later part of the crash, the driver airbag may support to the head and neck and protect the occupant when the occupant is positioned closer to the conventional driving seating position.

Generally speaking, dependent on the initial seat position and occupant size/weight, which may be monitored by an occupant sensor and/or a time-of-flight camera, and the crash severity monitored by a vehicle control unit e.g., by measuring acceleration or deceleration of the vehicle centre tunnel, either different energy absorption/force levels may be engaged and/or different activation/unlocking times of the locking mechanism of the seat may be employed. More generally, typical activation times for the unlocking of the locking mechanism may vary between 0 and 106 ms and the force levels of the seat track load limiter may vary between 5 kN and 60 kN of energy absorption.

In certain collision cases, it may be conceivable that the seat may not be decoupled/released at all for energy absorption, e.g., when the current seating position substantially corresponds to a conventional driving seating position and a movement of the seat is not required or desired since the airbag is already capable of providing the desired protection for the occupant.

Additionally, or alternatively, with/to the repositioning of the seat, a particular shape of the airbag for re-staining the neck and the hat may provide additional protection, depending on the current position of the seat with regards to the conventional driving seating position. E.g., in case the seat has assumed the conventional driving seating position, it may be sufficient to provide a conventional airbag shape for protection of the occupant. In case the airbag is released at a time point when the seat is not (yet) in the conventional driving seating position, either because it cannot move or be moved into the conventional driving seating position in a sufficient time until the airbag needs to be released, the airbag may be adapted in its shape or structure to the specific (current) seating position at the time of deployment of the airbag. In other words, dependent on the current seating position at the time of airbag activation, a specific shape of the airbag may be provided. In this regard, in case of the sieges in the conventional driving seating position, a conventional airbag shape and structure may be released, while a dedicated non-conventional airbag shape may be employed and released in case the seat is (still) in a non-conventional seating position. Such a nonconventional airbag shape may provide additional protection and/or support for the neck and the head of an occupant. E.g., the airbag may be allowed to inflate to a larger extent in order to bridge or span a larger volume of vehicle interior space between the origin of the airbag and the head of the occupant.

The adaptive shape of the airbag may be provided by at least one additional tether of the airbag, e.g., arranged inside of the airbag. Said at least one tether may then be released or not released depending on the specific deployment conditions. E.g., in case the airbag is supposed to inflate to its regular, conventional size, the at least one extra tether may not be released, while the airbag size increases beyond its regular, conventional size with the release of the tether. Additionally, or alternatively, it may be conceivable to provide at least two tethers, arranged substantially symmetrically to the deployments direction of the airbag. In this scenario, a deployment of the at least two tethers may allow the sides of the airbag to extend further into the vehicle interior, thereby providing additional side support for the head and neck of the occupant. In other words, the release of the at least two tethers may provide an airbag shape, e.g., a V- or a U-shape, to accommodate the head and neck of the occupant, by extending past and beyond the head of the occupant. Such an airbag may be seen as having side arms at least partially wrapping around the head and/or neck of the occupant.

According to an embodiment of the present disclosure, the method may further comprise monitoring the current seating position and activating an airbag element dependent on the current seating position.

According to a further embodiment of the present disclosure, the system may further comprise an airbag element, wherein the seating position sensor element may be adapted to monitor a current seating position and wherein the airbag element may be activated dependent on the current seating position.

A position dependent activation may allow the adaptation of the airbag release to provide preferred protection for the occupant of the seat associated with the airbag. Depending on the position, the airbag may be deployed when a certain position is assumed or may adapt the timing of the airbag deployment dependent on a current seating position and/or an estimated or calculated future seating position. Likewise, the airbag itself may be adapted, e.g., its shape or structure dependent on the monitor seating position.

According to a further embodiment of the present disclosure, the method may further comprise determining at least one parameter out of the group consisting of a vehicle velocity, a vehicle weight, and occupant weight, and occupant size, they crash severity and a pre-crash seating position, and may further comprise activating the airbag element depending on the at least one of the parameters.

According to a further embodiment of the present disclosure, the system may further comprise an airbag element, wherein the system may determine at least one parameter out of the group consisting of a vehicle velocity, a vehicle weight, an occupant weight, an occupant size, a crash severity and a pre-crash seating position, wherein the airbag element may be activated dependent on at least one of the parameters.

A parameter dependent activation of the airbag may allow further improving the protection of an occupant by adapting the airbag activation to a specific occupancy and/or crash scenario.

According to a further embodiment of the present disclosure, the connection mechanism may comprise an energy absorption element to absorb inertial energy of the seat and/or the occupant, and/or activation energy for the sliding, while the sliding of the seat from the rearward seating position to the conventional driving seating position.

The provision of an energy absorption element may reduce forces acting on an occupant by dissipating at least part of the crash energy in the energy absorption element prior to activation and deployment of the airbag. Further, the deployment of the airbag may be adapted to the specific amount of energy absorbed by the energy absorption element, which may further comprise employing the previously mentioned parameters.

According to a further embodiment of the present disclosure, the amount of absorbed energy may progressively increase with the continued sliding of the seat, and/or the amount of force required for the continued sliding of the seat may progressively increase with the continued sliding of the seat.

According to a further embodiment of the present disclosure, the energy absorption element may be arranged so that the amount of absorbed energy progressively increases with the continued sliding of the seat and/or the energy absorption element may be arranged so that the amount of force required for the continued sliding of the seat progressively increases with the continued sliding of the seat.

By providing progressively increasing energy absorption, the beneficial effects may be increased by allowing a larger total amount of energy being absorbed by the energy absorption element before the seat reaches the conventional driving seating position while at the same time minimizing any potential remaining offset to the conventional driving seating position which would result in case too much energy would be absorbed by the energy absorption element. In other words, by the progressive increase, the majority of the energy to be absorbed is absorbed in the vicinity of the conventional driving seating position.

According to a further embodiment of the present disclosure, the unlocking of the locking mechanism may comprise an active unlocking of the locking mechanism, in particular the locking mechanism may comprise at least one of an electromechanical unlocking element, and electromagnetic unlocking element and a pyrotechnical unlocking element for locking.

By unlocking of the locking mechanism and/or providing a dedicated looking element, the seat release, i.e., the start of the sliding movement of the seat towards the conventional driving seating position may be initiated more precisely and in particular in a defined manner. The pyrotechnical unlocking elements may comprise alternatively or additionally an explosive charge that further provides a propelling force for the seat to move towards the conventional driving seating position. A combination of more than one unlocking element may be conceivable, e.g., unlocking or releasing the seat by one of a electromechanical and a electromagnetic unlocking element while further providing the pyrotechnical unlocking element, e.g., as an explosive charge, accelerating and/or propelling the seat towards the conventional driving seating position.

According to a further embodiment of the present disclosure, the airbag element may be adapted in its shape, structure and/or material to the rearward seating position, and/or the airbag element may be arranged for being adapted in its shape and/or structure when released, dependent on it being released to protect an occupant in a rearward seating position or in a conventional driving seating position.

In particular by providing an airbag element that may be adapted in its shape and/or structure, protection for the occupant associated with said airbag may be increased, by adapting the airbag shape and/or structure to a crash scenario and seating scenario.

BRIEF DESCRIPTION OF THE DRAWINGS

The present invention will now be described with reference to the accompanying drawings, in which:

FIGS. 2A to 2C show an exemplary seat movement in a vehicle crash scenario according to the present disclosure.

DETAILED DESCRIPTION

Figures 1A, 1B, 1C:
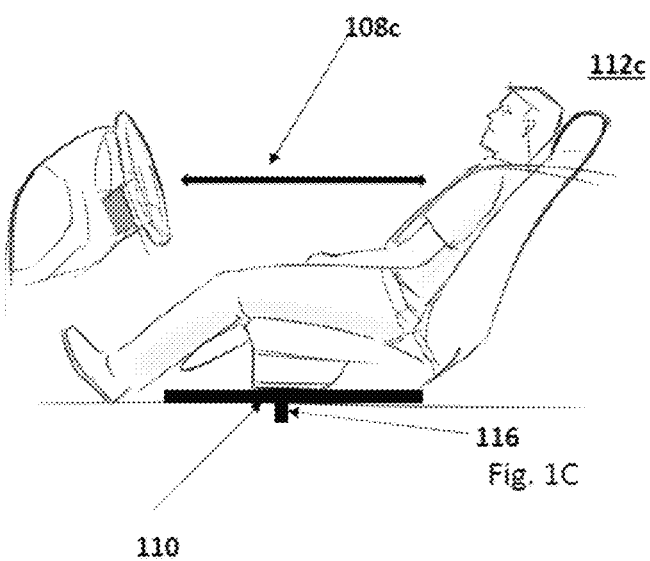
FIGS. 1A to 1C show different exemplary seating positions according to the present disclosure.

Now referring to FIGS. 1A to 1C, where different exemplary seating positions according to the present disclosure are depicted.

FIGS. 1A to 1C show different scenarios of an occupant 106, exemplary a driver 106, of a vehicle 100. In FIG. 1A, the occupant 106 is in a conventional driving seating position 112a where the occupant 106 is operating themselves the steering wheel 102. The occupant 106 is situated in a seat 104, which is attached to the vehicle 100 by a connection mechanism 110. The distance 108a is thus such that the occupant 106 is able to reach steering wheel 102 with their arms to allow the steering of the vehicle 100. As can be seen in FIG. 1A, the seat 104 is arranged at the front side of the connection mechanism 110. A seating position sensor element 116 is schematically depicted in FIG. 1A, determining that seat 104 and thus the occupant 106 is seated in the conventional driving seating position 112a.

In FIG. 1B, the occupant 106 together with seat 104 is assuming a more rearward seating position 112b. The driving situation in FIG. 1B may correspond to a driving situation in an autonomous vehicle, where the occupant 106 is not required to operate the vehicle 100, e.g., by using the steering wheel 102. Instead, the vehicle 100 is operating autonomously in accordance with the parameters set by an autonomous driving system of the vehicle 100. This rearward seating position 112b in FIG. 1B has an increased distance 108b to the steering wheel 102. The seat 104 is thereby arranged somewhere in the middle part of the connection mechanism 110. The occupant 106 thus uses the additional available space compared to the conventional driving seating position 112a, together with the autonomous vehicle operation to operate mobile device 114, which would otherwise not be legally allowed.

In FIG. 1C, the occupant 106 is arranged even further from the steering wheel 102, exemplified by the even greater distance of 108c, which is larger than distance 108b, which in turn is larger than distance 108a. In the autonomous driving situation of FIG. 1C, the occupant 106 is even reclined in seat 104, taking a nap. This rearward seating position 112*b* or autonomous driving seating position 112*c* is provided by situating seat 104 towards the rear end of the connection mechanism 110. As with FIGS. 1A and 1B, seating position sensor element 116 determines in FIG. 1C the seating position of the seat 104/the occupant 106 as a rearward seating position 112*b*, and autonomous driving seating position 112*c*, respectively.

Now referring to FIGS. 2A to 2C, where an exemplary seat movement in a vehicle crash scenario according to the present disclosure is depicted.

FIG. 2A shows occupant 106 in a rearward seating position 112*b/c*, in an autonomous driving situation operating mobile device 114. The distance 208*a* between the occupant 106 and the steering wheel 102 is such that in case an airbag would now be deployed, distance 208*a* would be too large to allow effectively protecting the occupant 106 by the airbag 200. Accordingly, in accordance with the present disclosure, occupant 106 in seat 104 is moved forward from the rearward seating position 112*b/c* to a conventional driving seating position 112*a*, depicted in FIGS. 2B and 2C. In the conventional driving seating position 112*a*, distance 208*b* is smaller than distance 208*a* of FIG. 2A. In order to transition from the rearward seating position 112*b/c* to the conventional driving seating position 112*a*, the seat 104, which in FIG. 2A is in a locked state, is unlocked, thereby allowing the sliding of the seat 104 within the connection mechanism 110. Connection mechanism 110 may be a common seat rail arranged for moving back and forth a vehicle seat. Alternatively, connection mechanism 110 may be a mechanism dedicated only for the movement of the seat 104 in the event of a vehicle crash. In this case, an additional sliding mechanism for the conventional seat adjustment to accommodate different driver sizes may be provided. Such an additional sliding mechanism is not depicted in the figures. In order to arrive at the conventional driving seating position 112*a*, the locked seat 104 is unlocked by a locking mechanism, which is not specifically depicted in FIGS. 2A to 2C. The unlocking of the seat 104 allows the sliding of the seat in the connection mechanism 110. E.g., in a crash scenario, where the vehicle currently occupied by occupant 106 frontally collides into an obstacle, an unlocked seat 104 accommodating occupant 106 would move 202 to the front of the vehicle by inertial energy stored in the seat 104 and the occupant 106. Thereby, the seat 104 and the occupant 106 transition from the rearward seating position 112*b/c* to the conventional driving seating position 112*a*, where an airbag 200 deployment may provide conventional protection to the occupant 106. The deployment of the airbag 200 is depicted in FIG. 2C.

Figures 3A, 3B:
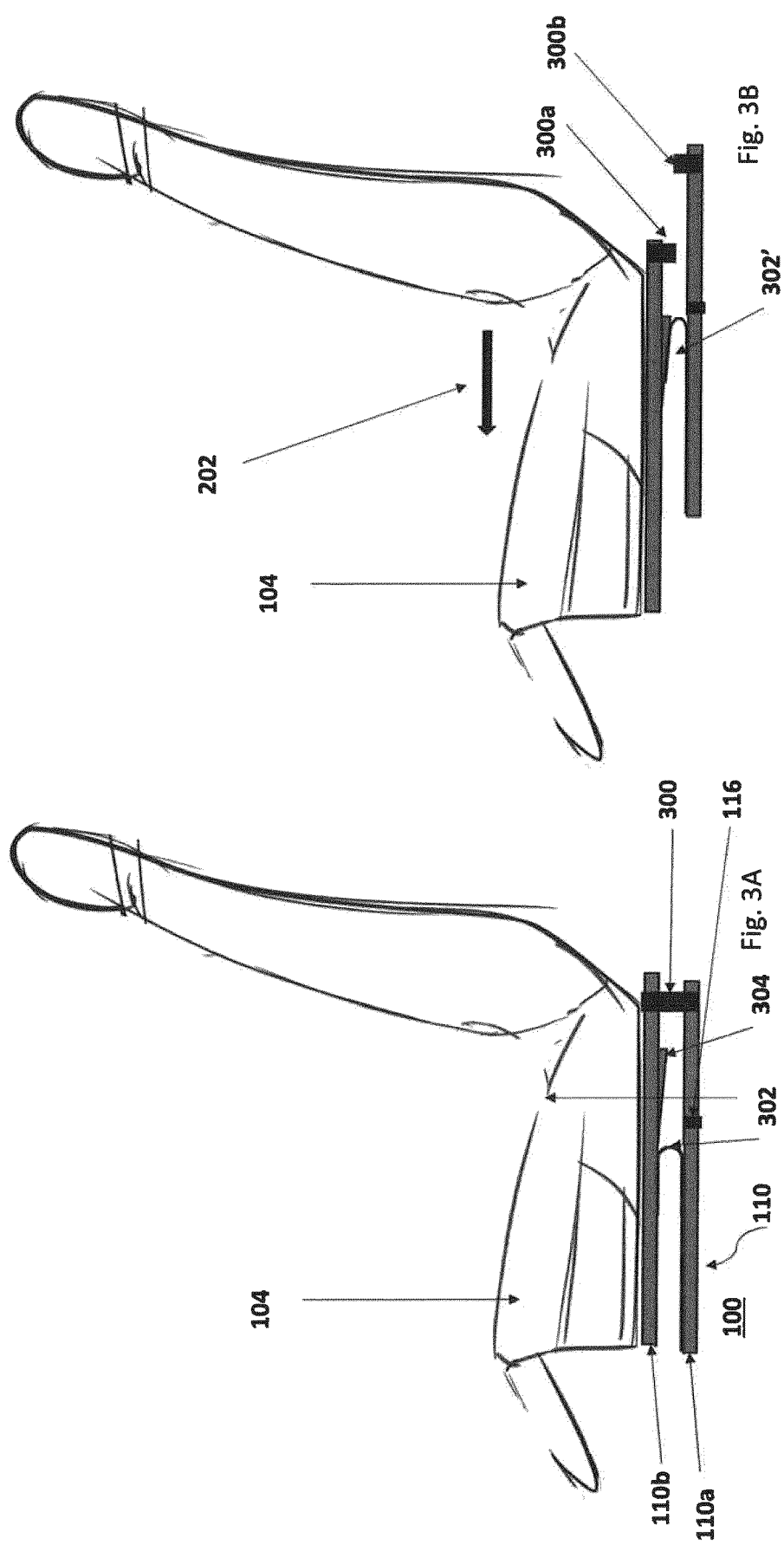
FIGS. 3A and 3B show an exemplary embodiment of a vehicle seat with an energy absorption element in a locked position and in an unlocked position in a crash scenario according to the present disclosure.

Now referring to FIGS. 3A and 3B, where an exemplary embodiment of a vehicle seat with an energy absorption element in a locked position and in an unlocked position in a crash scenario according to the present disclosure is depicted.

FIG. 3 *a* shows seat 104 in a locked position, in particular in a rearward seating position 112*b/c*. The connection mechanism 110 is depicted in more detail and comprises a lower part 110*a*, which is securely affixed to the vehicle 100 and an upper part 110*b*, which is securely affixed to the seat 104. A dedicated, in particular conventional, sliding mechanism connecting the lower part 110*a* and the upper part 110*b* is provided but not specifically depicted in FIGS. 3A, B. In FIG. 3A, the lower part 110*a* and the upper part 110*b* of the connection mechanism are locked relative to another by locking mechanism 300, only schematically depicted.

Between the lower part 110*a* and the upper part 110*b*, an energy absorption element 302 and a wedge element 304 are arranged. Again, a seating position sensor element 116 is schematically depicted in FIGS. 3A,B, determining the position of the seat 104 and thus of the occupant 106, and more specifically, whether the seat/occupant is in a conventional driving seating position 112*a* or a rearward seating position 112*b,c*.

The connection mechanism 110 may act as a seat load limiter arranged in the seat construction. The energy absorption element 302 is exemplarily embodied as a U-shaped part resting on one of its legs and having a radial shape/radius part, oriented or pointing in the direction of wedge element 304. The energy absorption element 302 may be plastically deformable by the wedge element 304 in case the upper part 110*b* of the connection mechanism 110 is moving, in an unlocked state, relative to the lower part 110*a*, in particular when the upper part 110*b*, to which the wedge element 304 is securely affixed to, moves towards the front of the vehicle, while the lower part 110*b*, securely affixed to the vehicle floor, remains in place. The wedge element 304 and the energy absorption element 302 progressively overlap in space, resulting in a plastic deformation of the radius part of the energy absorption element 302. The wedge element 304 thus transforms the radius part of the energy absorption element 302 to a smaller size, thereby creating a progressive force that progressively increases in resistance during the continued forward movement, until the seat 104 finally stops its forward movement in the seat rails when the inertial energy has been dissipated by the deformation, i.e. has been converted into energy employed for the deformation of the energy absorption element 302. An exemplary displacement of the seat 104 may be up to 400 mm until arriving at a stop.

Generally, and not specifically associated with the described embodiment, such an energy absorption element may be embodied by a metal element, e.g., a steel element, arranged between the vehicle floor and the seat track. The metal is preferably a high-quality steel, which allows reduction in size to achieve a defined energy dissipation. The amount of energy dissipated may be controlled by the steel quality, a sheet thickness of the metal, the width of the energy absorption element, the number of energy absorption elements and the shape and size of the wedge element. By forcing the deformation radius of the energy absorption element by the wedge element to a smaller size, a progressive force may be created.

FIG. 3B shows seat 104 in an unlocked position where the individual unlocking element parts 300*a,b* of the unlocking element 300 are separated. Thus, seat 104 has moved distance 202 towards the front of the vehicle. Thereby, the wedge element 304 and the energy absorption element 302 overlap, resulting in a deformed energy absorption element 302'. Inertial energy stored in the seat 104 and occupant 106, not depicted in FIGS. 3A, B, was thus dissipated by the deformation of the energy absorption element 302 to arrive at its shape 302'.

Unlocking element 300 including individual unlocking element parts 300*a,b* are only depicted schematically. Exemplarily, the unlocking element 300 may be embodied as an electromechanical element where one of the unlocking element parts 300*a,b* provides a form fit with the respect to the other unlocking element part 300*a,b*. Alternatively, unlocking element 300 may be an electromagnetic element, where unlocking element parts 300*a,b* are locked together by a magnetic attractive force, which may be released, thus unlocked, by disengaging the energy provided to the electromagnet. Still alternatively, unlocking element 300 may be a pyrotechnical element, where an explosive charge or the like separates locked unlocking element parts 300*a,b*. the explosive charge may merely separate the locked unlocking element parts 300*a,b*, or may additionally also provide a propelling force to the seat 104 and thus the occupant 106, for propelling towards the conventional driving seating position. In other words, the explosive charge may thus provide an initial acceleration force, e.g., for acceleration beyond the acceleration obtainable by inertial energy alone.

When it has been determined that the seat 104 has been moved to the conventional driving seating position 112*a*, the airbag 200 may be deployed. Seating position sensor element 116 may be used to determine not only the general position with regard to a conventional driving seating position 112*a* and a rearward seating position 112*b/c* but the specific, in particular current, seating position. In other words, seating position sensor element 116 may ascertain at which position the seat/occupant is currently arranged at. This information together with additional parameters like vehicle velocity, vehicle weight, occupant weight, occupant size, and crash severity, as well as further information about the crash like point of impact etc. may be used to determine the specific point in time of the deployment of the airbag.

Figure 4:
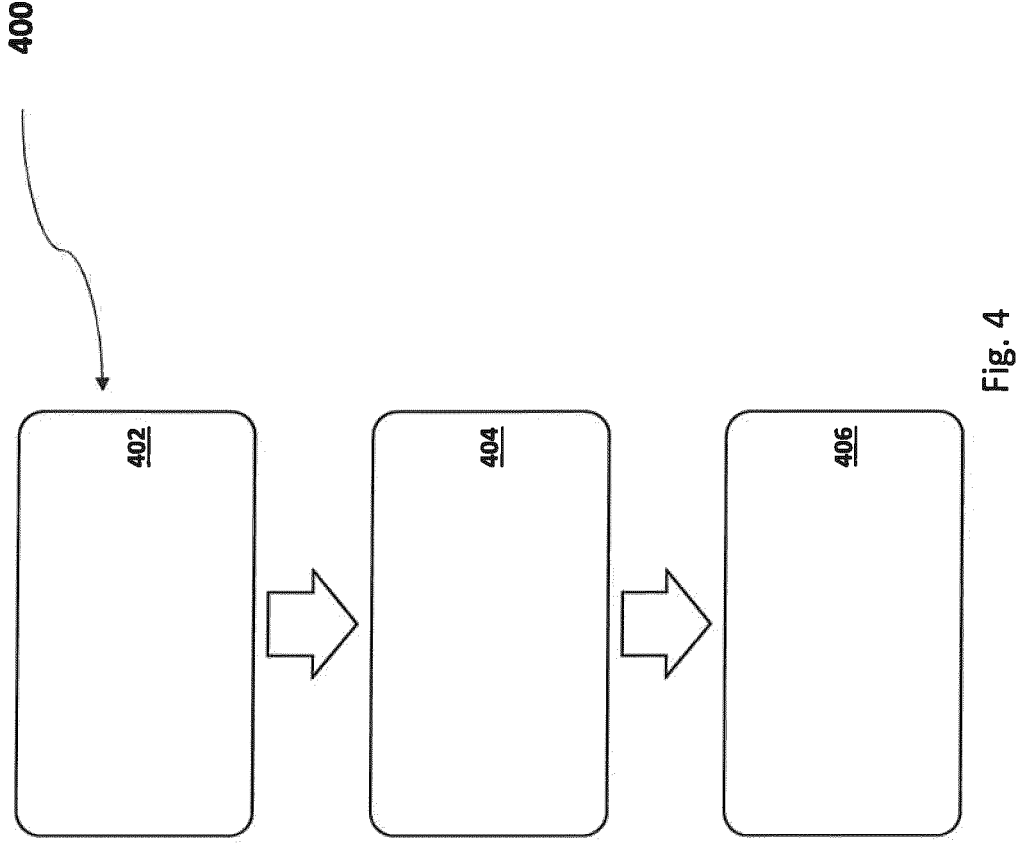
FIG. 4 shows an exemplary embodiment of a method for occupant protection according to the present disclosure.

Now referring to FIG. 4, where an exemplary embodiment of a method for occupant protection according to the present disclosure is depicted.

Accordingly to FIG. 4, there is provided a method 400 for occupant protection in a vehicle 100, the vehicle comprising at least one seat 104 for accommodating an occupant 106, wherein the seat 104 is slidably connected with the vehicle by a connection mechanism 110, and wherein the seat 104 is lockable in a defined seating position 112*a,b,c* by a locking mechanism 300*,a,b*, to prevent sliding in the connection mechanism when locked and to allow sliding when unlocked, the method 400 comprising determining 402 an imminent or ongoing vehicle crash; determining 404 a seating position; upon the determination of the seat being an in a rearward seating position 112*b,c* and the occurrence of an imminent or ongoing vehicle crash; unlocking 406 the locking mechanism to allow the sliding of the seat from the rearward seating position 112*b,c* towards a conventional driving seating position 112*a*, in particular wherein the sliding of the seat from the rearward seating position 112*b,c* towards the conventional driving seating position 112*a* is performed by using inertial energy from the vehicle crash.

It is to be understood that the invention is not limited to the embodiments described above, and various modifications and improvements may be made without deviating from the concepts described here. Any of the features described above and below may be used separately or in combination with any other features described herein, provided they are not mutually exclusive, and the disclosure extends to and includes all combinations and sub-combinations of one or more features described herein.

Finally, it should be noted that the term "comprising" not exclude other elements or steps, and that "a" or "one" does not exclude the plural. Elements that are described in relation to different types of embodiments can be combined. Reference signs in the claims shall not be construed as limiting the scope of a claim.

LIST OF REFERENCE NUMERALS

100 Vehicle
102 Steering Wheel
104 Seat

12

106 Occupant
108*a,b,c* Distance
110,*a,b* Connection Mechanism
112*a* Conventional driving seating position
112*b,c* Rearward seating position/Autonomous driving seating position
114 Mobile Device
116 Seating position sensor element
200 Airbag
202 Movement
208*a,b* Distance
300,*a,b* Locking mechanism
302,302' Energy absorption element
304 Wedge Element
400 Method for occupant protection
402 Determining crash
404 Determining seating position
406 Unlocking locking mechanism

The invention claimed is:

1. A method for occupant protection in a vehicle, the vehicle comprising at least one seat for accommodating an occupant,
   wherein the seat is slidably connected with the vehicle by a connection mechanism; and,
   wherein the seat is lockable in a defined seating position by a locking mechanism, to prevent sliding in the connection mechanism when locked and to allow sliding when unlocked;
   the method comprising:
   determining an imminent or ongoing vehicle crash;
   determining a seating position; and
   upon a determination of the seat being an in a rearward seating position and the occurrence of an imminent or ongoing vehicle crash;
   unlocking the locking mechanism to allow the sliding of the seat from the rearward seating position towards a conventional driving seating position,
   wherein the sliding of the seat from the rearward seating position towards the conventional driving seating position is performed by using inertial energy from the vehicle crash;
   wherein an airbag element is configured to be adapted in its shape, structure, and/or material based on an estimated future seating position.

2. The method according to claim 1, the method further comprising:
   monitoring a current seating position; and
   activating the airbag element dependent on the current seating position.

3. The method according to claim 2,
   wherein the airbag element is adapted in its shape, structure and/or material to the rearward seating position; and/or
   wherein the airbag element is arranged for being adaptable in its shape and/or structure when released, dependent on it being released to protect an occupant in a rearward seating position or in a conventional driving seating position.

4. The method according to claim 1, the method further comprising:
   determining at least one parameter out of the group consisting of a vehicle velocity, a vehicle weight, an occupant weight, an occupant size, a crash severity and a pre-crash seating position; and
   activating the airbag element dependent on at least one of the parameters.

5. The method according to claim 1, wherein the connection mechanism comprises an energy absorption element to absorb inertial energy of the seat and/or the occupant, and/or activation energy for the sliding, while the sliding of the seat from the rearward seating position to the conventional driving seating position.

6. The method according to claim 5, wherein an amount of absorbed energy progressively increases with continued sliding of the seat; and/or wherein an amount of force required for continued sliding of the seat progressively increases with continued sliding of the seat.

7. The method according to claim 1, wherein unlocking the locking mechanism comprises an active unlocking of the locking mechanism, wherein unlocking the locking mechanism employs at least one of an electromechanical unlocking element, an electromagnetic unlocking element and a pyrotechnical unlocking element.

8. A computer-readable storage medium comprising instructions which, when executed by a computing element, cause the computing element to carry out the steps of the method of claim 1.

9. A vehicle comprising:

a computing element comprising a computer-readable storage medium comprising instructions which, when executed by the computing element, cause the computing element to carry out the steps of the method of claim 1.

10. A vehicle occupant protection system, comprising:

a seat for accommodating an occupant;

a connection mechanism adapted to slidably connect the seat and a vehicle;

a locking mechanism to lock the seat in a defined seating position, to prevent sliding in the connection mechanism when locked and to allow sliding when unlocked;

a crash sensor element adapted for determining an imminent or ongoing vehicle crash;

an airbag element; and, a seating position sensor element adapted for determining a seating position;

wherein, upon a determination of the seat being in a rearward seating position and occurrence of an imminent or ongoing vehicle crash, the locking mechanism is unlocked, to allow the sliding of the seat from the rearward seating position towards a conventional driving seating position, wherein the sliding of the seat from the rearward seating position towards the conventional driving seating position is performed by using inertial energy from the vehicle crash;

wherein the airbag element is configured to be adapted in its shape, structure, and/or material based on an estimated future seating position.

11. The system according to claim 10, wherein the seating position sensor element is adapted to monitor a current seating position; and wherein the airbag element is activated dependent on the current seating position.

12. The system according to claim 11, wherein the airbag element is adapted in its shape, structure and/or material to the rearward seating position, and/or wherein the airbag element is arranged for being adaptable in its shape and/or structure when released, dependent on it being released to protect an occupant in a rearward seating position or in a conventional driving seating position.

13. The system according to claim 10, wherein the system determines at least one parameter out of the group consisting of a vehicle velocity, a vehicle weight, an occupant weight, an occupant size, a crash severity and a pre-crash seating position; and wherein the airbag element is activated dependent on at least one of the parameters.

14. The system according to claim 10, the connection mechanism further comprising:

an energy absorption element to absorb inertial energy of the seat and/or the occupant, and/or activation energy for the sliding, during the sliding of the seat from the rearward seating position to the conventional driving seating position.

15. The system according to claim 14, wherein the energy absorption element is arranged so that an amount of absorbed energy progressively increases with continued sliding of the seat; and/or wherein the energy absorption element is arranged so that an amount of force required for continued sliding of the seat progressively increases with the continued sliding of the seat.

16. The system according to claim 10, wherein unlocking the locking mechanism comprises an active unlocking of the locking mechanism, wherein the locking mechanism comprises at least one of an electromechanical unlocking element, an electromagnetic unlocking element and a pyrotechnical unlocking element for unlocking.

17. A vehicle comprising a vehicle occupant protection system according to claim 10.

* * * * *